United States Patent [19]

Petzsch et al.

[11] 4,135,699

[45] Jan. 23, 1979

[54] CONTROL VALVE FOR GASEOUS AND LIQUID MEDIA

[75] Inventors: Lothar Petzsch; Alfred Rentel, both of Bad Kreuznach, Fed. Rep. of Germany

[73] Assignee: Seitz-Werke GmbH, Bad Kreuznach, Fed. Rep. of Germany

[21] Appl. No.: 790,578

[22] Filed: Apr. 25, 1977

[30] Foreign Application Priority Data

Apr. 23, 1976 [DE] Fed. Rep. of Germany ....... 2617721

[51] Int. Cl.[2] .............................................. F16K 7/02

[52] U.S. Cl. ..................................... 251/320; 251/331; 251/DIG. 1

[58] Field of Search ................... 251/319, 320, 335 R, 251/DIG. 2, 331, 190, 191, DIG. 1

[56] References Cited

U.S. PATENT DOCUMENTS

| | | | |
|---|---|---|---|
| 3,058,431 | 10/1962 | Eddy | 251/319 X |
| 3,258,026 | 6/1966 | Weaver | 251/319 X |
| 3,415,275 | 12/1968 | Berggren | 251/331 X |
| 3,605,812 | 9/1971 | Richter | 251/324 X |
| 3,768,514 | 10/1973 | Goto | 251/191 X |

FOREIGN PATENT DOCUMENTS

| | | | |
|---|---|---|---|
| 903769 | 2/1954 | Fed. Rep. of Germany | 251/331 |
| 1334433 | 7/1963 | France | 251/331 |

*Primary Examiner*—Arnold Rosenthal
*Attorney, Agent, or Firm*—Walter Becker

[57] ABSTRACT

A control valve for fluid media which includes a housing with a bore having a widened section intermediate its ends into and from which inlet and outlet passages lead for the respective fluid medium to be controlled. A resilient diaphragm or diaphragm with a force to continually urge the diaphragm to assume its normal diametrical shape is provided in the widened section and in its normal, i.e., radially non-expanded condition, defines with the inner wall of the widened section a space establishing intercommunication between the inlet and outlet passages. The diaphragm is provided with a bore extending in the direction of and substantially parallel to the housing bore. Reciprocably mounted in the bore of the housing is a valve pin having a section extending through the diaphragm bore and including a first axially extending portion of a diameter less than the diameter of the diaphragm bore so as to be freely movable into and out of the diaphragm bore, the valve pin also having a second axially extending portion of a diameter greater than the diameter of the first axially extending portion and movable into the diaphragm bore only while increasing the outer diameter of the diaphragm so as to cause the outer periphery of the diaphragm to close off those ends of the passages which lead into the space which in the normal diametrical shape of the diaphragm establishes communication between the passages, the diaphragm sealing the first and second axially extending portions of the valve pin with regard to the inlet and outlet passages.

12 Claims, 4 Drawing Figures

CONTROL VALVE FOR GASEOUS AND LIQUID MEDIA

The present invention relates to a control valve for gaseous and liquid media, in which the passages conveying the medium lead in the valve housing to at least one valve chamber in which there is axially movably arranged a valve pin which opens and closes the passage for the medium. Such control valve is preferred for the use in connection with vessel or container filling machines, especially for shutting off the gas conduits of counter pressure filling elements.

With heretofore known control valves of the above mentioned type, the valve pin acts as direct shut-off element in the valve chamber. To this end, between the valve housing and the valve pin, there are required sealing elements which are inserted into the valve housing either as O-ring seals (see for instance German Offenlegungsschrift No. 20 62 669) or may be connected as sealing rings on the valve pin as disclosed for instance in German Pat. No. 11 21 495. In both instances, the medium to be controlled, whether as tension gas (Spanngas), return gas (Rückgas), the medium to be filled, or the cleaning fluid, directly contact the surface of the valve pin which fact is disadvantageous for the pin material, the easy movement of the pin or also for the media. Furthermore, the seals between the valve pin and the valve housing are subjected to an increased wear so that the medium to be controlled has the tendency to leak out either within the control valve, also in its closing position, to pass in more or less great quantities from one passage into another passage or to leak out from the valve housing around the valve pin.

It is, therefore, an object of the present invention to provide a control valve of the general type described above, according to which the medium to be controlled does not at all contact the surface of the valve pin, while the above mentioned difficulties as to material and sealing possibilities will be obviated.

It is still another object of this invention to provide a control valve as set forth in the preceding paragraph which is of a simple construction and can be easily actuated.

These and other objects and advantages of the invention will appear more clearly from the following specification in connection with the accompanying drawings, in which.

Figure 1:
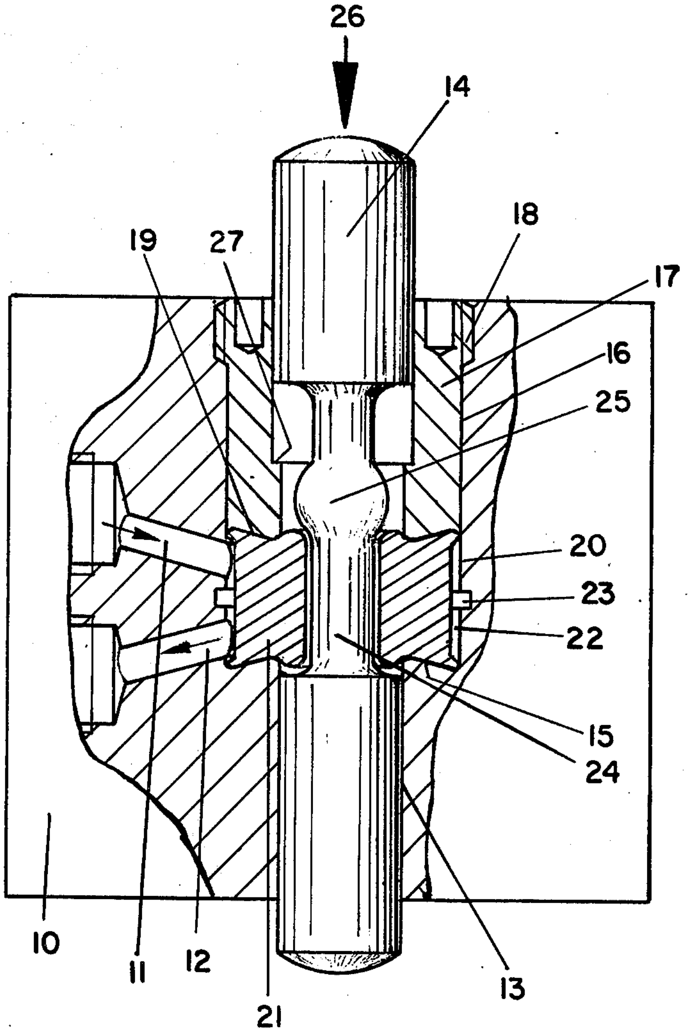
FIG. 1 shows a vertical section of a control valve according to the invention with the valve occupying its open position.

The control valve according to the invention is characterized primarily in that the valve chamber is formed by at least one depression in the circumferential wall of the axial guiding means for the valve pin while conduit means convey the medium into said valve chamber. The valve chamber is covered by means of a diaphragm equipped with a return force while a hollow chamber is mentioned which is sealed relative to the mouth of said conduit means. The valve pin is axially passed by said diaphragm and is provided with devices for pressing the diaphragm into said hollow chamber in one axial position and is furthermore provided with devices for freeing the diaphragm in another axial position.

Diaphragm gate valves and diaphragm valves are known in which the diaphragms are firmly connected to a piston which is displaceable substantially at a right angle to the diaphragm surface in order in response to the actuation of the piston either to be pressed into the passage of the slide or valves to be pressed in or pushed out. In order to keep such known diaphragm gates and diaphragm valves in their closing position, the piston carrying the diaphragm must be equipped with a self-locking actuating device (see for instance the German technical Dictionary Lueger, Lexikon der Technik, Volume 1, Pages 313 and 314). A simple actuation by axially displacing a valve pin in a direction substantially parallel to the diaphragm surface is not possible with these known diaphragm gates and diaphragm valves.

The diaphragm according to the present invention has its outer edges provided with counter bearings and sealing strips resting on the bottom of the valve chamber while the central region of that side of the diaphragm which faces the valve pin is provided with a projection engaging the circumferential surface of the valve pin. In this way, the diaphragm itself forms a particularly advantageous seal for the valve chamber and for the hollow chamber formed by the diaphragm together with the valve chamber, relative to the space in which the valve pin moves. Furthermore, in this way the return force of the diaphragm can be improved and increased in a simple manner.

According to a further development of the invention, the inlet and outlet passages associated with each other and located in the valve housing may lead into the valve chamber in the vicinity of the oppositely located lateral confinements of the valve member. The diaphragm may be provided with a central sealing strip to be pressed against the bottom of the valve chamber. In this way, a safe sealing between the inlet and outlet passages is assured without the necessity of employing too high actuating pressures upon the diaphragm.

According to another embodiment of the invention, an annular groove may be provided in the bottom of the valve chamber between outlet and inlet passages associated with each. The diaphragm when occupying the closing position of the valve is adapted partially to be pressed into said annular groove.

According to a preferred embodiment of the invention, the depression in the circumferential wall of the axial guiding means for the valve pin, which depressions forms the valve chamber, is substantially designed as annular groove, while the diaphragm is designed as an elastic ring extending around the valve pin in one or the other control region. The valve pin itself may be in the form of a rotation symmetric body. In this embodiment of the invention, the structure of the valve is particularly simple so that when servicing the valve, the exchange of the diaphragm can easily be effected. To this end, the annular diaphragm may be held by at least one bushing which guides the valve pin and is inserted into the housing bore which forms the valve chamber. The bushing may be provided with a grease chamber. Also the valve pin itself may with this preferred embodiment of the invention be designed particularly simple and may have a reduced control region for the opening control of the valve. Furthermore, the valve pin may adjacent to the reduced open control region be provided with a somewhat greater closing control region. Between these two control regions there may, furthermore, an additional thicker portion be provided on the valve pin in order to secure the valve pin against accidental adjustment from one control position to the other control position. If in such an instance, the valve pin has a thicker portion at both ends, preferably O-rings which at both pin ends are respectively inserted in two grooves, form yieldable end abutments for the valve pin.

Figure 2:
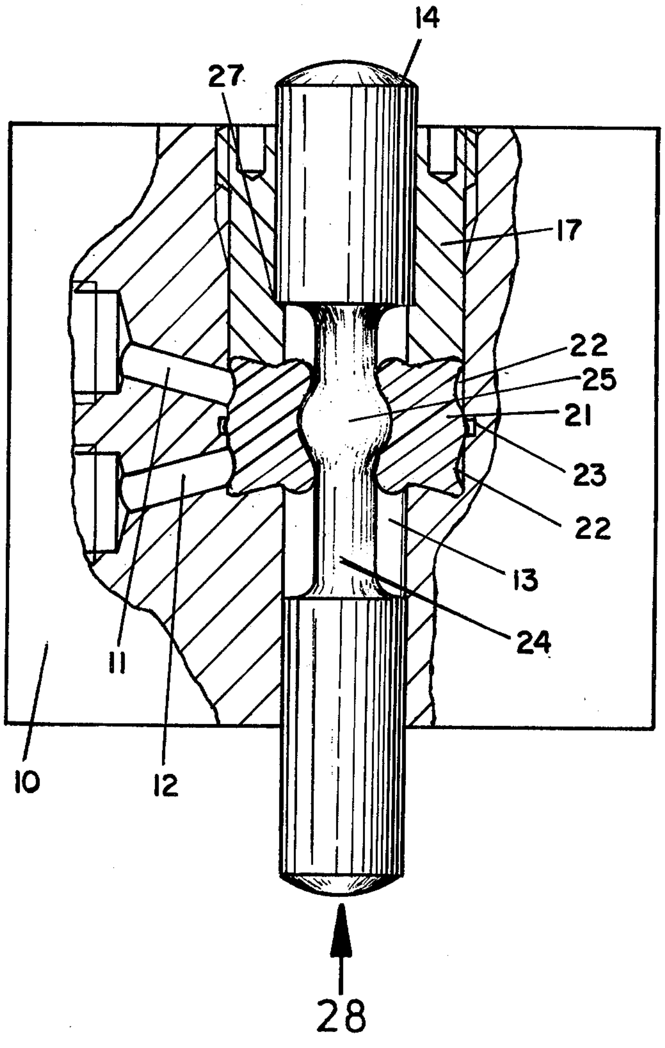
FIG. 2 shows the control valve of FIG. 1 in its closed position.

Referring now to the drawings in detail, in the embodiment of FIGS. 1 and 2, the control valve has a valve housing 10 having provided therein the passages or conduits 11 and 12 for admitting and discharging a medium to be controlled, for instance a liquid. The housing 10 furthermore comprises a guiding bore 13 for the lower end of a valve pin 14 which bore 13 in the upper portion thereof by means of an undercut shoulder 15 merges with a wider bore 16. In the upper portion of bore 16 there is inserted a bushing 17 which is threadedly connected to the housing 10 by means of an inner thread 18 in bore 16. The bushing 17 serves as guiding means for the upper end of the valve pin 14 and has at its lower end which extends into the housing 10 a likewise undercut shoulder 19. Both shoulders 15 and 19 together with the circumferential wall in the lower region of the wider bore 16 and within the housing 10 form a depression relative to the axial guiding means of the valve pin 14 which depression forms a valve member 20. The inlet and outlet passages 11 and 12 lead into the valve chamber 20. An annular diaphragm 21, while maintaining a hollow chamber 22 relative to the mouths of the passages 11 and 12, is so inserted into the valve chamber 20, that the chamber 22 is sealed relative to the space of movement of the valve pin 14. In this connection, the diaphragm 21 is as far as possible held by the two shoulders 15 and 19 between which said diaphragm is clamped while the oppositely located annular surfaces are slightly deformed. The valve chamber 20 is furthermore provided with an annular groove 23 which is arranged between the mouths of the inlet and outlet passages 11 and 12 in the circumferential wall of the wider bore 16. The valve pin 14 has a constricted section centrally passing through the diaphragm 21 and defining a reduced control region 24 between the upper and lower end. Valve pin 14 also has a ball-shaped control region 25 arranged adjacent said control region 24 and having a somewhat greater diameter than that of region 24.

FIG. 1 shows the valve in its open position in which the open control region 24 of the valve 14 is surrounded by the diaphragm 21. In this connection, the diaphragm 21 which is as far as possible non-deformed leaves the mouth of the passages 11 and 12 open so that the medium to be controlled can pass from passage 11 through the maintained hollow chamber 22 into the passage 12. By pressing in the valve pin 14 in the direction of the arrow 26 until the upper portion of valve 14 abuts an inner shoulder 27 provided in the bushing 17, the valve will occupy the closing position shown in FIG. 2. In this connection, the ball-shaped control region 25 is displaced into the interior of the diaphragm 21 and deforms the latter. As a result thereof, the diaphragm 21 will while eliminating the hollow chamber 22 which is adapted to bring about the connection between the passages 11 and 12, be pressed against the circumferential wall of the valve chamber 20 and in the central region is pressed into the annular groove 23 so that the flow of the medium between the passages 11 and 12 is interrupted. In no position of the valve will the medium pass to the valve pin 14 and the guiding means therefor. By again pressing in the valve pin 14 in the direction of the arrow 28, the open-control region 24 will subsequently be displaced back into the open position of FIG. 1 whereby the flow of the medium is established. According to the embodiment of FIG. 3, the valve housing is likewise provided with passages 11 and 12 for respectively admitting and discharging the medium to be controlled. As indicated above, the channels 11 and 12 may also radially or tangentially lead into the valve chamber 20. According to the embodiment of FIG. 3, the guiding bore 13 in the valve housing 10 is at both sides provided with a widened bore 16 into which are respectively inserted bushings 17. The shoulders 15 of the guiding bore 13 in the central portion of the housing as well as the shoulders 19 of the bushings 17 are likewise undercut and together with the circumferential wall of the widened portions 16 respectively form two superimposed valve chambers 20. Annular members 21 respectively held by the shoulders 15 and 19 and partially defining a hollow chamber 22 are inserted opposite the mouth of the passages 11 and 12. As will be evident from the upper portion of FIG. 3, each diaphragm 21 has its outer circumferential edges respectively provided with a counter bearing and sealing strip 29 resting on the bottom of the valve chamber 20 while each diaphragm 21 in the central portion of its outer surface comprises a further sealing strip 30. Moreover, each diaphragm 21 has that inner surface thereof which faces the valve pin 14 provided with a projection 31 which engages the circumferential surface of valve pin 14 and has the shape of a bead. With this embodiment, the valve pin 14 has for the upper and lower diaphragm 21 only one reduced open-control region 24 which in the position whown in FIG. 3 cooperates with the upper diaphragm 21, whereas the lower diaphragm 21 engages a full region of the valve pin 14 and thus occupies its closing position.

Figure 3:
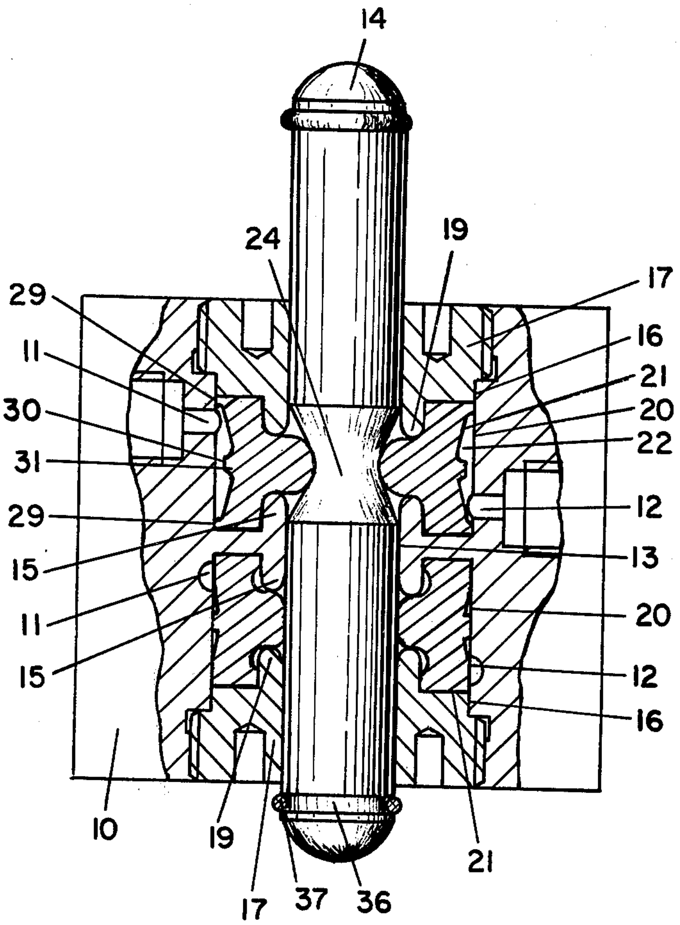
FIG. 3 represents a vertical section through another embodiment of a control valve according to the invention.

As will also be seen from FIG. 3, the inlet and outlet passages 11 and 12 for the medium lead to lateral confinements of the valve chamber opposite to each other so that with the diaphragm 21 occupying its closing position as shown in the lower portion of FIG. 3, in view of the sealing strip 30 there exists a complete closure between the two passages 11 and 12 associated with each other.

Figure 4:
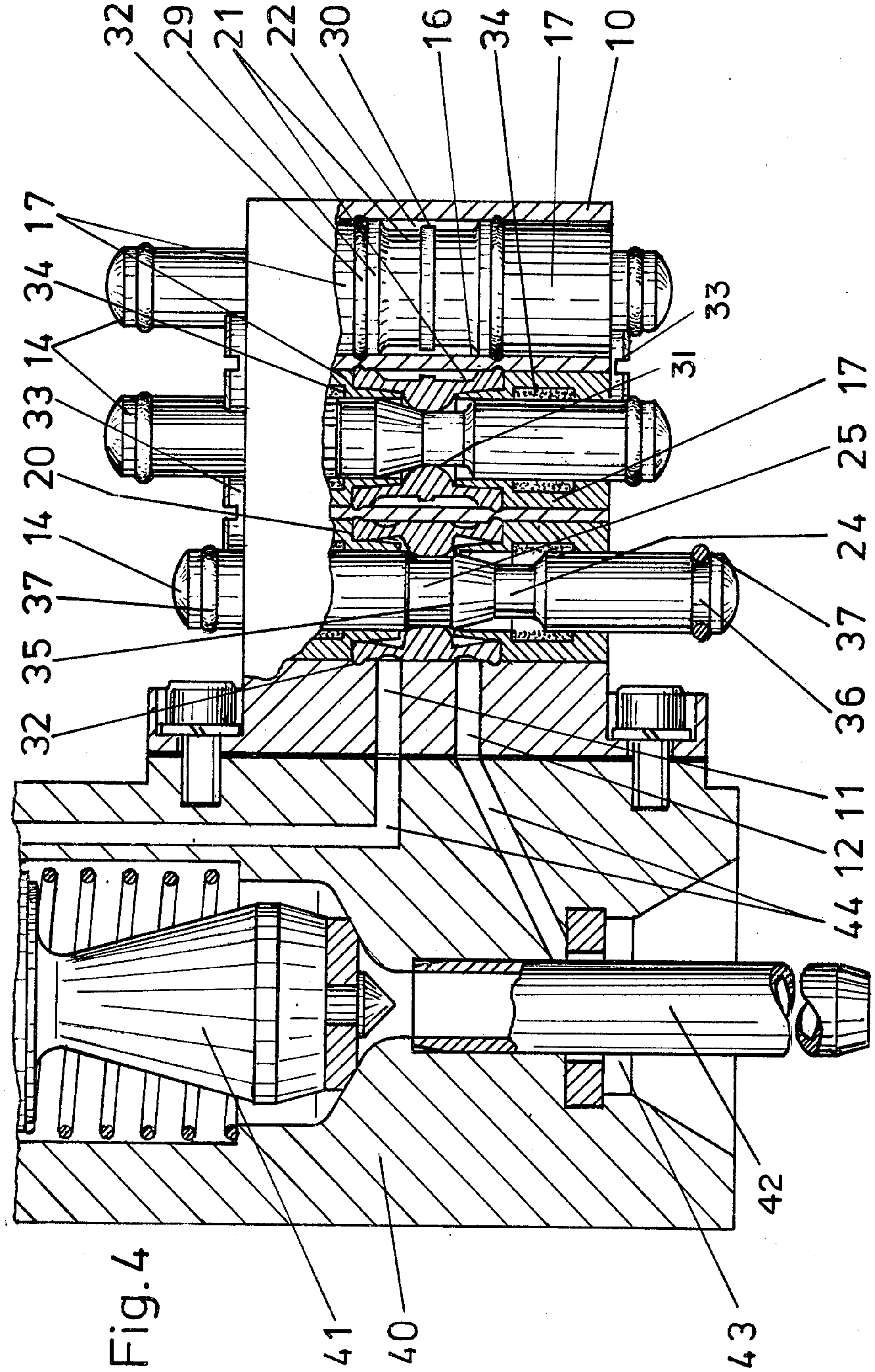
FIG. 4 shows a partial vertical section through still another embodiment of a control valve according to the invention in combination with a counter pressure filling element.

FIG. 4 shows as a practical case of employment of the present invention a plurality of valves combined to a valve group in cooperation with a partially illustrated counter pressure filling element for vessel filling machines. This counter pressure filling element comprises an element filling housing 40, a spring urged liquid valve 41 which is displaceable as to height and arranged in housing 40, a filling pipe 42 and a tension gas conduit 44 which extends from the source of tension gas through a vessel centering means 43 into a pressed-on vessel. The tension gas conduit 44 is connected to the inlet and outlet passages 11 and 12 of the valve arranged on the left hand side which valve is shown in axial section and occupies its closing position. The valve which corresponds to the valve of the left hand side and is likewise shown in axial section, as well as the valve on the right hand side which is shown with partial broken away housing wall respectively occupy their open position and are likewise with associated inlet and outlet bores connected to non-illustrated gas conduits of the filling elements. The wider bore 16 which partially defines the valve chamber 20 has a continuous uniform width with each valve of the valve group. The bore 16 has merely two annular grooves for receiving a sealing bead 32 arranged on the counter bearing strips 29 of the respective diaphragm 21. From each side of the housing 10, a bushing 17 is inserted into the bore 16 and is held by means of screws 33. Each bushing 17 has its interior provided with a chamber 34 containing grease for lubricating the valve pin 14. The length of bushing 17 is so dimensioned that the end faces in housing 10 of said bushings are arranged in spaced relationship to each other and located opposite to each other. Moreover, the outer circumference of the bushings within the region of the end faces is offset and conically tapers in the direction toward the end faces. The offset and reduced portion of the bushings 17 located opposite to each other form together with the circumferential wall of bore 16 the valve chamber 20 in the central region of the valve housing 10. The annular diaphragm 21 is, while partly forming the hollow chamber 22, inserted into the valve housing 10 and is held by the bushings 17. In distinction over the embodiments of FIGS. 1–3, with the valve pin 14 of FIG. 4, the region 24 employed for opening-control of the valve is cylindrically reduced, and the region 25 determined for the closing-control of the valve is likewise substantially cylindrical, but has a greater diameter than the region 24. Between the two regions 24 and 25, there is provided an additional bead 35 which prevents the valve pin 14 from accidentally moving from one control position into the other, especially from the closing position into opening position. Outside the control region proper 24, 25, 35, the free ends of the valve pin 14 which ends have an increased diameter, are with the embodiments of FIGS. 3 and 4 respectively provided with O-rings 37 inserted into respective grooves 36. The O-rings 37 together with the bead 31 of the diaphragm 21 which bead 31 slides over the valve pin 14, form a yieldable end abutment for the respective control position of the valve pin 14. With all three embodiments, a safe valve control will be assured as well as an easy actuation of the valve and a low wear at the valve parts. The medium control led by the valve does not pass to the valve pin and therefore cannot leak out along the valve pin.

The diaphragms 21 may consist of an elastic material preferably of synthetic material or rubber adapted to the respective medium.

It is, of course, to be understood that the present invention is, by no means, limited to the specific showing in the drawings, but also comprises any modifications within the scope of the appended claims.

What we claim is:

1. A control valve for fluid media consumable as nourishment especially beverages filled into containers by machine operation which includes in combination: housing means with a bore having a widened chamber section intermediate its ends, inlet and outlet conduit means arranged in said housing means and leading into and out of said widened chamber section for conveying the fluid medium to be controlled, elastically acting diaphragm means arranged in said widened chamber section and having an outer peripheral portion movable radially outwardly with regard to the bore of said housing means from a connecting position in which said peripheral portion is spaced from said inlet and outlet conduit means so as to permit communication between said inlet and outlet conduit means to a closing position in which said peripheral portion prevents communication between said inlet and outlet conduit means, said diaphragm means being provided with a bore extending in the axial direction of the bore of said housing means, a valve pin actuatable from two sides as reciprocably mounted in said bore of said housing means and having a section extending through the bore of said diaphragm means, said valve pin section having two different diameter portions selectively movable into and out of said bore of said diaphragm means for selectively moving said diaphragm means into a first position for interrupting fluid communication between said inlet and outlet conduit means or into a second position for establishing communication between said inlet and outlet conduit means.

2. A control valve for fluid media consumable as nourishment especially beverages filled into containers by machine operation which includes in combination: housing means with outer marginal wall portions and a bore having a widened valve chamber section intermediate its ends, inlet and outlet conduit means arranged in said housing means and leading into and out of said widened valve chamber section for conveying the fluid medium to be controlled, elastic diaphragm means arranged in said widened valve chamber section and having an outer peripheral portion movable radially outwardly with regard to the bore of said housing means from a connecting position in which said peripheral portion is spaced from said inlet and outlet conduit means so as to permit communication between said inlet and outlet conduit means to a closing position in which said peripheral portion prevents communication between said inlet and outlet conduit means, said diaphragm means being provided with a bore extending in the axial direction of the bore of said housing means, a valve pin actuatable from two sides as reciprocably mounted in said bore of said housing means and having a section extending through said bore of said diaphragm means, said valve pin section having a first axially extending portion of a diameter less than the diameter of the bore of said diaphragm means so as to be freely movable into and out of the bore of said diaphragm means during open position without affecting the outer diameter of said diaphragm means, said valve pin also having a second axially extending portion with a diameter greater than the diameter of said first axially extending portion and movable into the bore of said diaphragm means while simultaneously increasing the outer diameter of said diaphragm means so as to cause the outer periphery of said diaphragm means expanded thereby only in closure position to close off those ends of said inlet and outlet conduit means which lead into and out of said widened section.

3. A valve in combination according to claim 1, in which side portions of said diaphragm means are provided firmly pressed in between lateral outer marginal wall portions of said housing means which laterally define those portions of said widened section which radially extend beyond the diameter of the adjacent bore section of said housing means.

4. A valve in combination according to claim 1, in which one lateral annular wall section defining the radial outer portion of said widened valve chamber section forms one end face of a bushing forming a detachable part of said housing means.

5. A valve in combination according to claim 1, in which said diaphragm means has its outer periphery provided with radially projecting bead means resting against adjacent wall portions pertaining to said housing means and located laterally of said inlet and outlet conduit means.

6. A valve in combination according to claim 5, in which the peripheral portion of said diaphragm means which is located between said radially projecting bead means is in said second position of said diaphragm means spaced from said inlet and outlet conduit means.

7. A valve in combination according to claim 5, which includes a peripheral sealing strip between said radially projecting bead means.

8. A valve in combination according to claim 1, in which said housing means between said inlet conduit means and said outlet conduit means is provided with an annular groove sealingly engaged by said diaphragm means in response to the latter occupying said second position.

9. A valve in combination according to claim 5, in which said diaphragm means forms an elastic annular member, and in which the space between said radially projecting bead means in said second position of said diaphragm means forms an annular depression.

10. A valve in combination according to claim 4, in which said bushing is provided with a grease chamber for lubricating said valve pin.

11. A valve in combination to claim 2, in which said valve pin section between said first and second axially extending portions has an annular bead for preventing said valve pin section from accidentally changing its axial position relative to the bore in said diaphragm means.

12. A valve in combination according to claim 2, in which each end portion of said valve pin has a diameter larger than that of the shortest diameter portion of said valve pin and is provided with an annular groove, an O-ring being provided in said last mentioned annular groove and forming an abutment for limiting the axial movement of said valve pin.

* * * * *